(12) United States Patent
Dodd et al.

(10) Patent No.: US 6,888,777 B2
(45) Date of Patent: May 3, 2005

(54) ADDRESS DECODE

(75) Inventors: James M. Dodd, Shingle Springs, CA (US); Robert Milstrey, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/229,617

(22) Filed: Aug. 27, 2002

(65) Prior Publication Data

US 2004/0042320 A1 Mar. 4, 2004

(51) Int. Cl.[7] ................................................. G11C 8/00
(52) U.S. Cl. ........................... 365/230.06; 365/230.03; 365/230.01
(58) Field of Search ...................... 365/230.06, 230.03, 365/230.01, 230.08, 189.05; 711/147, 5

(56) References Cited

U.S. PATENT DOCUMENTS

| | | | |
|---|---|---|---|
| 5,051,889 A | * | 9/1991 | Fung et al. .................. 711/157 |
| 5,367,494 A | * | 11/1994 | Shebanow et al. ....... 365/230.03 |
| 5,603,010 A | | 2/1997 | Dodd et al. |
| 5,848,258 A | | 12/1998 | Fenwick et al. |
| 5,875,470 A | * | 2/1999 | Dreibelbis et al. ........... 711/147 |
| 5,881,016 A | * | 3/1999 | Kenkare et al. ......... 365/230.03 |
| 6,304,510 B1 | * | 10/2001 | Nobunaga et al. ...... 365/230.06 |
| 6,366,524 B1 | * | 4/2002 | Abedifard ............... 365/230.06 |
| 6,389,514 B1 | | 5/2002 | Rokicki |
| 6,400,631 B1 | | 6/2002 | Williams et al. |
| 6,401,180 B1 | | 6/2002 | Hartmann |
| 6,425,047 B1 | | 7/2002 | Ozaki |
| 6,505,282 B1 | | 1/2003 | Langendorf et al. |
| 6,507,530 B1 | | 1/2003 | Williams et al. |
| 6,553,449 B1 | | 4/2003 | Dodd et al. |
| 6,697,888 B1 | | 2/2004 | Halbert et al. |
| 6,725,349 B2 | | 4/2004 | Langendorf et al. |
| 6,766,385 B2 | | 7/2004 | Dodd et al. |
| 2004/0044832 A1 | | 3/2004 | Dodd |

FOREIGN PATENT DOCUMENTS

EP         0 679 997 A1     11/1995

OTHER PUBLICATIONS

10/446986—P15754—A Method and Apparatus to Improve Multi–CPU System Performance for Accesses to Memory—Dodd et al.
10/284596—P15181—Memory Transaction Ordering—Dodd et al.
10/364280—P15186—Buffered Writes and Memory Page Control—Dodd.
10/199578—P13911—A system, apparatus, and method for a flexible dram architecture—Dodd et al.
10/104270—P13913—Memory system with burst length shorter than prefetch length—Dodd et al.

* cited by examiner

*Primary Examiner*—Richard Elms
*Assistant Examiner*—N. Nguyen
(74) *Attorney, Agent, or Firm*—Jeffrey B. Huter

(57) ABSTRACT

Machine-readable media, methods, and apparatus are described which process memory transactions. In some embodiments, a processor or other external components provide a memory controller with decoded memory addresses. The memory controller then may access the memory with the processor decoded address without decoding the address itself. In other embodiments, a processor or other external components provide a memory controller with partially decoded memory addresses. The memory controller then generates a decoded address from the partially decoded address and may access the memory with the generated decoded address.

39 Claims, 4 Drawing Sheets

ADDRESS DECODE

BACKGROUND

Computing devices typically comprise a processor, memory, and an external memory controller to provide the processor as well as other components of the computing device with access to the memory. The performance of such computing devices is strongly influenced by the "memory read latency" and "memory write latency" of the computing device. In general, the "memory read latency" is the length of time between when the processor requests the external memory controller to retrieve data from the memory and when the external memory controller provides the processor with the requested data. Similarly, the "memory write latency" is generally the length of time between when the processor requests the external memory controller to write data to the memory and when the external memory controller indicates to the processor that the data has been or will be written to the memory.

One factor that contributes to the latency of memory transactions is the length of time the memory controller takes to decode the address of the memory transaction. The memory controller typically includes an address decoder that generates memory selects that correspond to a hierarchal arrangement of the memory. Since the address decoder typically supports numerous different hierarchal arrangements, the address decoder comprises non-trivial logic that consumes multiple clock cycles to decode the address.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for decoding memory addresses and techniques for processing memory transactions that have decoded addresses. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
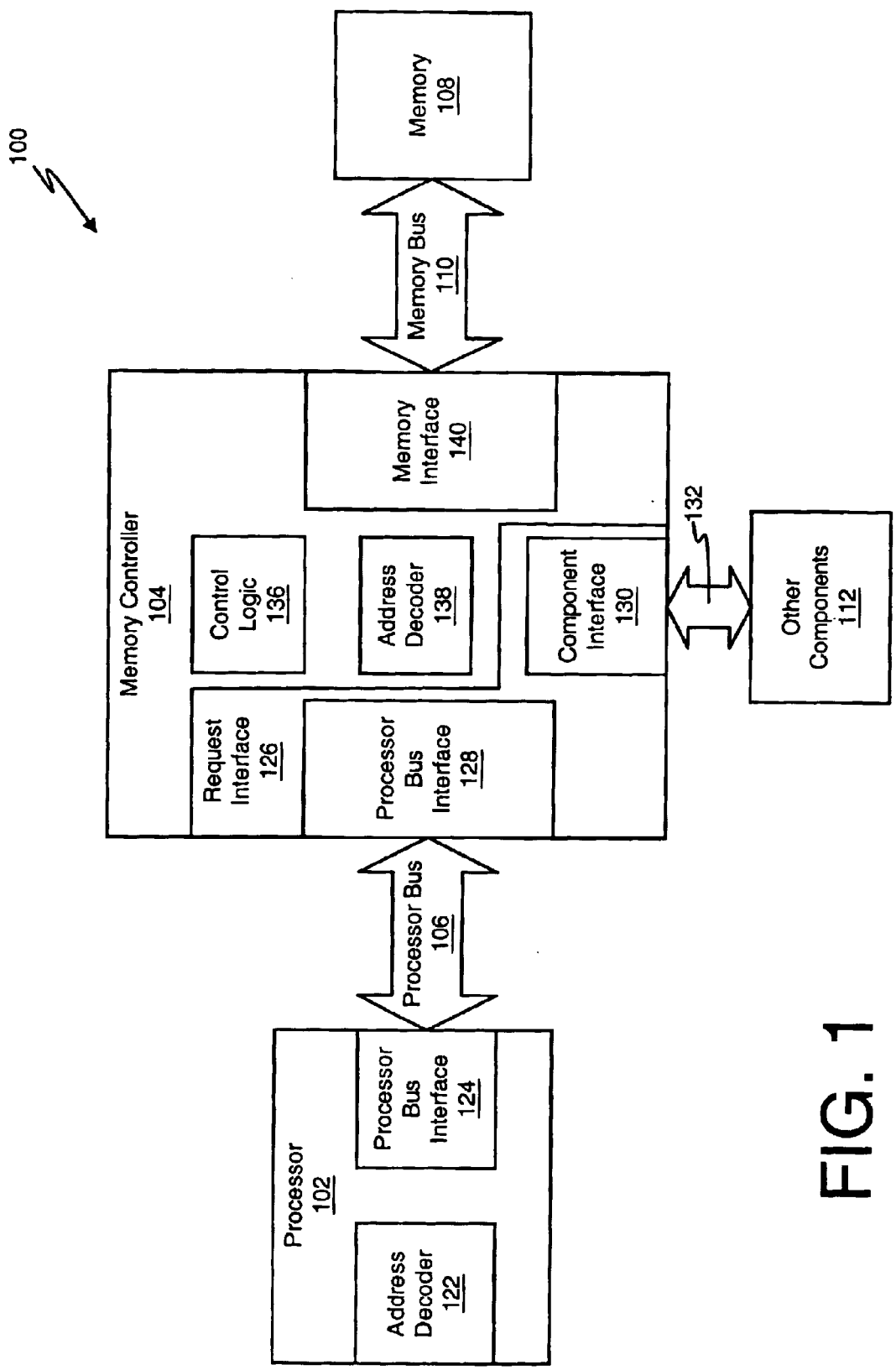
FIG. 1 illustrates an embodiment of a computing device.

An example embodiment of a computing device 100 is shown in FIG. 1. The computing device 100 may comprise a processor 102 and a memory controller 104 that is coupled the processor 102 via a processor bus 106. In one embodiment, the memory controller 104 is located external to the processor 102 in a different integrated circuit, chip, or module. Further, the memory controller 104 may be coupled to memory 108 via a memory bus 110 to provide the processor 102 and other components 112 (e.g. a mouse, keyboard, video controller, hard disk, floppy disk, firmware, etc.) of the computing device 100 with access to the memory 108.

Figure 2:
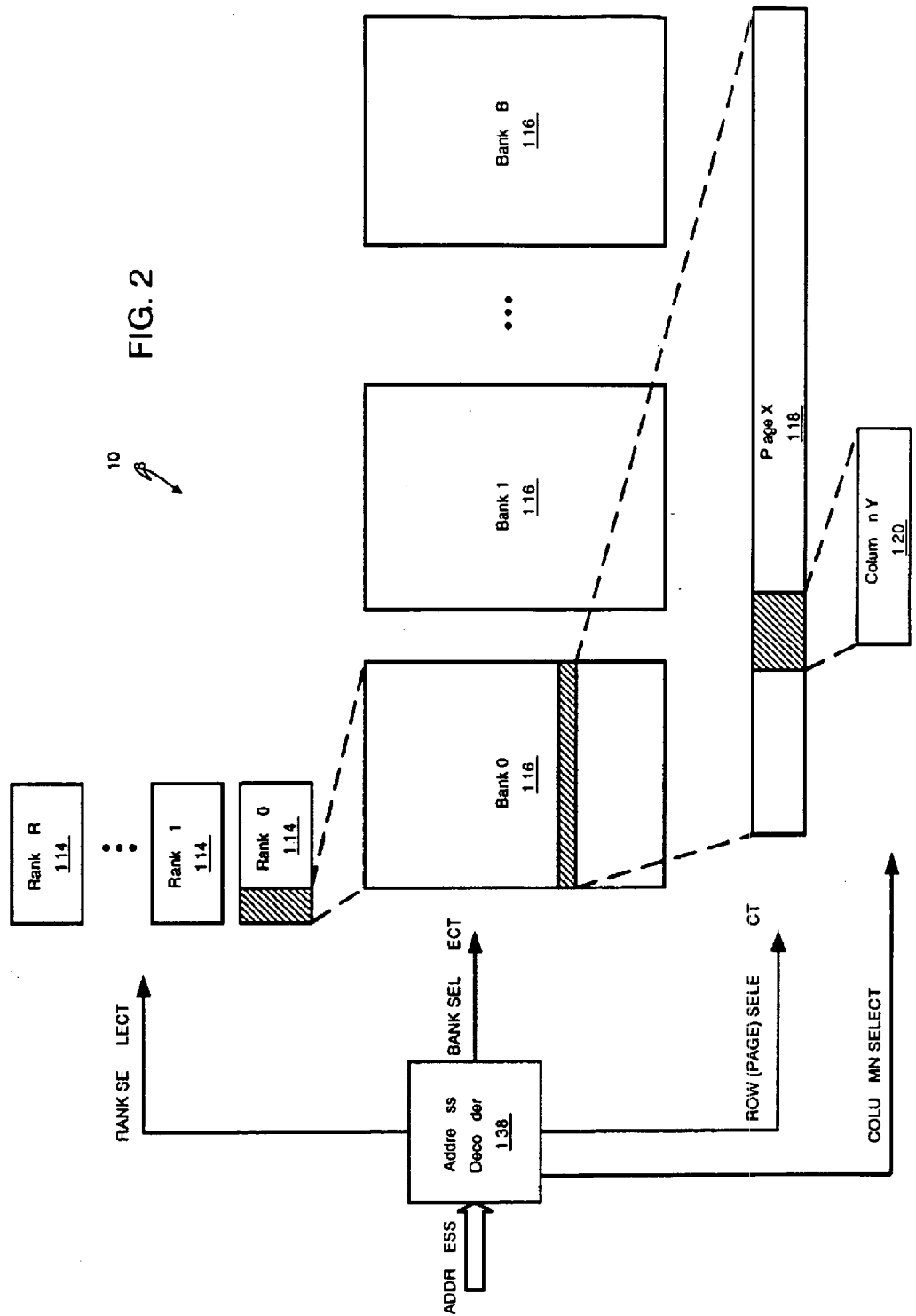
FIG. 2 illustrates an embodiment of a hierarchal memory arrangement of the computing device of FIG. 1.

The memory 108 may comprise various memory devices comprising addressable storage locations that the memory controller 104 may read data from and/or write data to. The memory 108 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices. Further, as illustrated in FIG. 2, the memory 108 may be arranged in a hierarchal manner. For example, the memory 108 may comprise one or more channels or ranks 114, each rank 114 may comprise one or more banks 116, each bank 116 may comprise one or more rows or pages 118, and each page 118 may comprise one or more chunks or columns 120. In other embodiments, the memory 108 may comprise more or fewer hierarchal levels than depicted in FIG. 2.

The processor 102 may comprise an address decoder 122 to decode an address of a pending memory transaction. The address decoder 122 may decode the address of the memory transaction to generate one or more memory selects that correspond to a hierarchal arrangement of the memory 108 and that may be used to select or address a particular storage location of the memory 108. In regard to the hierarchal arrangement depicted in FIG. 2., the address decoder 122, for example, may decode the address to generate a decoded address comprising a rank select, bank select, page select, and a column select that may be used to respectively select a rank 114, bank 116, page 118, and column 120 of the memory 108. In another embodiment, the address decoder 122 may partially decode the address to generate a partially decoded address, thus leaving the completion of the address decoding to the memory controller 104. For example, the partially decoded address may comprise one or more memory selects (e.g. a rank select and a bank select) and a non-decoded portion from which the memory controller 104 may generate one or more additional memory selects (e.g. a page select and a column select). As another example, the partially decoded address may comprise an intermediate form from which the memory controller 104 may generate memory selects more quickly than generating memory selects from non-decoded addresses. In particular, the intermediate form in one embodiment may include no memory selects.

The processor 102 may further comprise a processor bus interface 124 to handle and issue transactions on the processor bus 106. For example, the processor bus interface 124 may issue memory transactions on the processor bus 106 in order to request the memory controller 104 to process the memory transaction. Further, the processor bus interface 124 may respond to and/or track transactions that other bus agents such as, for example, the memory controller 104 and other processors (not shown) issue on the processor bus 106. Moreover, the processor bus interface 124 may provide the memory controller 104 with an indicator that indicates whether the address comprises a decoded and/or partially decoded address. For example, in one embodiment, the processor bus interface 124 may provide the memory controller 104 with the indicator during one or more address phases of the processor bus 106. In such an embodiment, the address may comprise one or more bits that are used as a format indicator that indicates whether the address comprises a decoded address, a partially decoded address, or non-decoded address (e.g. a physical address, virtual address, I/O address, etc.). In another embodiment, the processor bus interface 124 may provide the memory controller 104 with a format indicator for the memory transaction via a side-band signal or via a request type provided by another phase (e.g. request phase) of the processor bus 106.

The memory controller 104 may comprise a request interface 126 to send and/or receive memory transactions to and/or from the processor 102. In another embodiment, the request interface 126 may further send and/or receive memory transactions to and/or from the other components 112. The request interface 126 may comprise a processor bus interface 128 to communicate directly with the processor 102 via the processor bus 106. The request interface 126 may further comprise component interfaces 130 to communicate directly with the other components 112 via buses 132 such as, for example, peripheral component interconnect (PCI) buses, accelerated graphics port (AGP) buses, universal serial bus (USB) buses, low pin count (LPC) buses, and/or other I/O buses. In other embodiments, the request interface 126 communicates indirectly with the processor 102 and/or the components 112 via a processor bus interface 128 and component interfaces 134 of a chipset (not shown) that may comprise one or more packaged integrated circuit devices.

The memory controller 104 may further comprise control logic 136, an address decoder 138, and a memory interface 140 that is coupled to the memory bus 110. The memory interface 140 may apply one or more memory selects such as, for example, the rank select, bank select, and page select to the memory bus 110 to open a page 118 of memory 108 that is associated with the memory transaction. The memory interface 140 may further apply one or more memory selects such as, for example, the column select to the memory bus 110 to select a column 120 of the opened page 118 for reading and/or writing.

The address decoder 138 of the memory controller 104 may decode the address of a memory transaction to generate one or more memory selects that correspond to the hierarchal arrangement of the memory 108 and that may be used to select or address a particular storage location of the memory 108. In one embodiment, the address decoder 138 may generate from the address of a memory transaction a rank select, bank select, page select, and a column select that respectively select a rank 114, bank 116, page 118, and column 120 of the memory 108. In another embodiment, the address decoder 138 may complete decoding of a received partially decoded address by generating one or more additional memory selects (e.g. a page select and a column select) from the non-decoded portion which may be used with one or more memory selects (e.g. a rank select and bank select) provided by the decoded portion of the partially decoded address. In yet another embodiment, the address decoder 138 may complete decoding of the received partially decoded address by generating memory selects (e.g. a rank select, a bank select, a page select, and a column select) from an intermediate form provided by the partially decoded address.

The control logic 136 of the memory controller 104 may control the processing of received memory transactions. For example, the control logic 136 may select a memory transaction for processing from one or more received memory transactions. Further, the control logic 136 may determine whether to cause the address decoder 138 to forgo decoding of the address, to decode the address, or to complete decoding of a partially decoded address of the memory transaction. In one embodiment, the control logic 136 may determine whether to forgo decoding, to decode, or to complete decoding of the address based upon a format indicator provided by the processor 102 for the memory transaction.

In another embodiment, the processor 102 may comprise one or more control registers and/or other mechanisms that may be programmed (e.g. during system startup) to cause the processor 102 to provide the memory controller 104 with addresses in a particular format such as, for example, a decoded format, a partially decoded format, or a non-decoded format (e.g. a physical address or virtual address format). Similarly, the memory controller 104 may comprise one or more control registers or other mechanisms that may be programmed (e.g. during system startup) to cause the memory controller 104 to expect addresses from the processor 102 in the same format. In such an embodiment, the control logic 136 may determine the address format of a memory transaction received from the processor 102 based upon the status of its one or more control registers and may cause the address decoder 138 to forgo decoding, to decode, or to complete decoding accordingly. In yet another embodiment, the processor 102 only supports providing the memory controller 104 with memory transactions having decoded addresses. In such an embodiment, the control logic 136 may cause the address decoder 138 to forgo decoding of the address in response to determining that the memory transaction was received from the processor 102.

Figure 3:
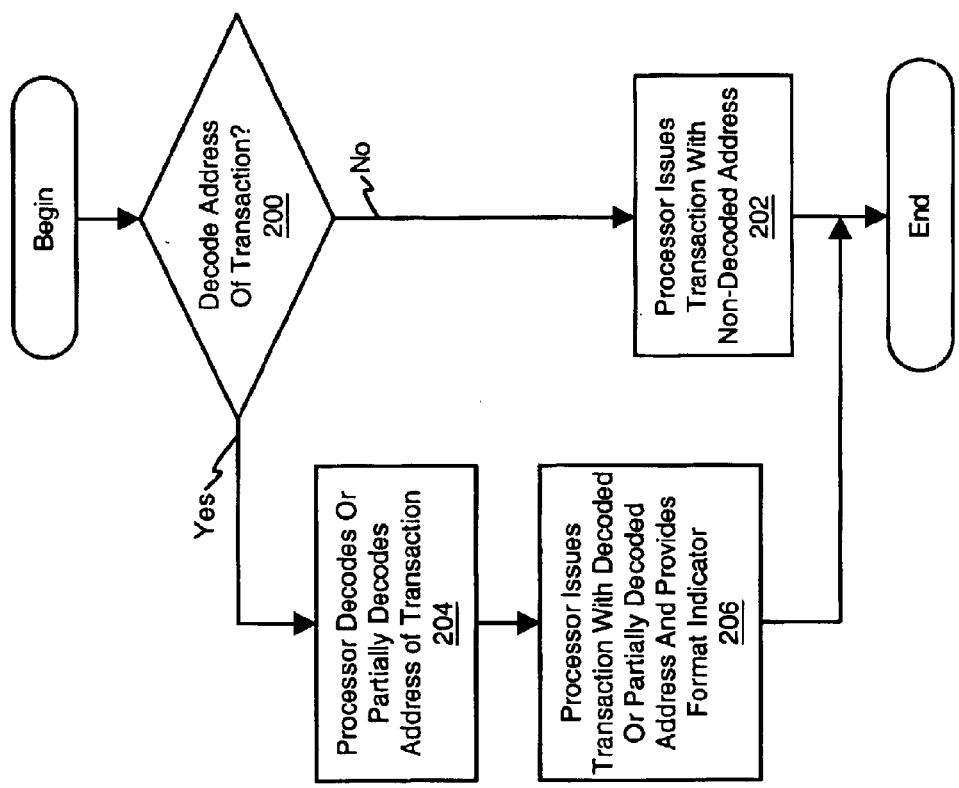
FIG. 3 illustrates an embodiment of a method that may be used by a processor of FIG. 1 to decode or partially decode an address of a transaction.

Shown in FIG. 3 is an embodiment of a method that may be used by the processor 102 to decode or partially decode an address of a transaction. In block 200, the processor 102 determines whether to decode the address of the transaction. The processor 102 may determine not to decode the address for various reasons. For instance, the processor 102 may determine not to decode the address in response to determining that the transaction is not a memory transaction (e.g. special transaction, I/O transaction, etc.). Further, the processor 102 may determine not to decode the address in response to having determined that the memory controller 104 does not support processor decoded addresses. The processor 102 may further determine not to decode the address in response to having determined that the processor 102 and/or memory controller 104 were not configured for processor decoded addresses. For example, a system startup routine of the computing device 100 may not configure the processor 102 and the memory controller 104 for processor decoded addresses due to, for example, (i) the BIOS (basic input/output system) not including routines to configure the processor 102 and/or memory controller 104 for such a configuration, or (ii) a user disabling such a configuration via the BIOS or operating system.

In response to determining not to decode the address, the processor 102 in block 202 issues the transaction on the process bus 106 via the processor bus interface 124. In particular, the processor bus interface 124 provides the memory controller 104 with the transaction and a non-decoded address (e.g. a physical address or a virtual address).

In response to the processor 102 determining to decode the address of the transaction, the address decoder 122 of the processor 102 in block 204 decodes or partially decodes the address. In one embodiment, the address decoder 122 generates a decoded address comprising memory selects that correspond to the hierarchal arrangement of the memory 108 and a format indicator that indicates a decoded address format. In another embodiment, the address decoder 122 generates a partially decoded address comprising a decoded portion (e.g. one or more memory selects), a non-decoded portion, and a format indicator or a partially decoded address comprising an intermediate form and a format indicator. In yet other embodiments, the decoded addresses and partially decoded addresses do not include a format indicator. In such embodiment, the format indicator of the transaction may be implied or may be provided or determined via another mechanism.

After generating a decoded or partially decoded address, the processor 102 in block 206 issues the transaction on the process bus 106 via the processor bus interface 124. In particular, the processor bus interface 124 in one embodiment provides the memory controller 104 with the transaction including the generated decoded or partially decoded address and the format indicator. In another embodiment, the processor bus interface 124 provides the memory controller 104 with the transaction including its decoded or partially decoded address but does not provide the format indicator with the transaction. In such embodiments, the format indicator may be implied and/or provided separate from the decoded addresses or partially decoded addresses. For example, in one embodiment, the processor 102 and memory controller 104 may be programmed during system startup or hardwired to use a particular address format, thus eliminating the need for the processor 102 to provide a format indicator with each memory transaction. In yet another embodiment, the processor 102 may provide the format indicator by programming the memory controller 104 to process subsequent memory transactions in accord with the programmed format. For example, the processor 102 may write to or otherwise update a control register of the memory controller 104 to cause the memory controller 104 to processor subsequent memory transactions from the processor 102 in accordance with the format indicated by the updated control register.

Figure 4:
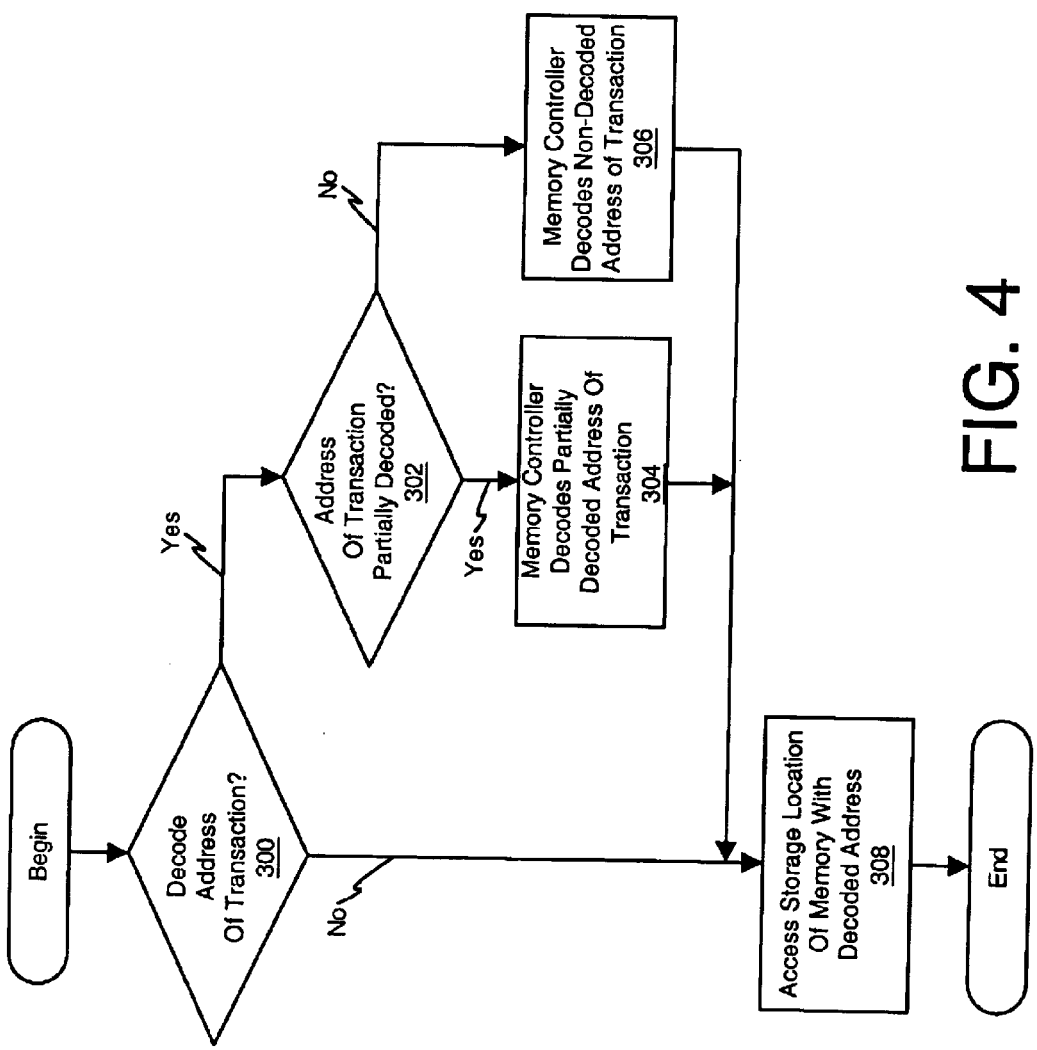
FIG. 4 illustrates an embodiment of a method that may be used by a memory controller of FIG. 1 to process a memory transaction.

Referring now to FIG. 4, there is depicted a method that may be used by the memory controller 104 to process a memory transaction selected from one or more pending memory transactions of the memory controller 104. In block 300, the control logic 136 determines whether to decode the address of the selected memory transaction. In one embodiment, the control logic 136 may determine to forgo decoding of the address based upon whether an explicit or implied format indicator indicates that an external component such as, for example, the processor 102 and/or other components 112 has decoded the address of the transaction.

In response to deciding to decode the address of the memory transaction, the control logic 136 in block 302 of the memory controller 104 determines whether the address of the memory transaction was partially decoded by an external component such as, for example, the processor 102 and/or other components 112. In one embodiment, the control logic 136 may determine that the address was partially decoded based upon an explicit or implied format indicator indicating that an external component has partially decoded the address of the transaction.

If partially decoded, the address decoder 138 of the memory controller 104 in block 304 processes the partially decoded address to generate a decoded address comprising memory selects that correspond to the hierarchal arrangement of the memory 108. In one embodiment, the address decoder 138 generates a decode address by decoding the non-decoded address portion of the partially decoded address to generate additional memory selects and replacing the non-decoded address portion with the additional memory selects. In another embodiment, the address decoder 138 generates a decoded address comprising two or more memory selects by processing an intermediate form that may comprise no memory selects. By partially decoding the address of the memory transaction, the processor 102 in one embodiment may reduce the memory latency since the address decoder 138 of the memory controller 104 may decode partially decoded addresses faster than non-decoded addresses.

If not partially decoded, the address decoder 138 of the memory controller 104 in block 306 decodes the non-decoded address to generate a decoded address comprising memory selects that correspond to the hierarchal arrangement of the memory 108. In one embodiment, the address decoder 138 may generate a rank select, bank select, a page select, and a column select that respectively select a rank 114, bank 116, page 118, and column 120 of the memory 108.

After forgoing decoding of the address in block 300 or after decoding the address in block 304 or 306, the control logic 136 in block 308, causes the memory interface 140 to access a storage location of the memory 108 using the decoded address of the memory transaction. For example, the memory interface 140 may open a page 118 of the memory 108 by generating page address signals on the memory bus 110 that are based upon one or more memory selects of the decoded address such as, for example, a rank select, a bank select, and a page select. Further, the memory interface 140 may access a column 120 of the opened page 118 by generating column address signals on the memory bus 110 that are based upon one or more memory selects of the decoded address such as, for example, a column select.

In one embodiment, the processor 102 operates at a faster rate than the memory controller 104. As a result, if the address decoders 122, 138 both decode memory addresses in the same number of local clock cycles, then the address decoder 122 of the processor 102 will take less time to decode an address than the address decoder 310 of the memory controller 104 due to the shorter duration of the processor clock cycles. Further, the processor 102 may be able to perform all or part of the address decode in parallel with other operations, thus eliminating all or a portion of the latency associated with the address decoder 122. In either case, the processor 102 may reduce the memory latency by providing the memory controller 104 with a decoded or partially decoded address.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   decoding a first address of a transaction to a memory to generate a second address; and
   issuing the transaction to provide a memory controller with the second address, and to request the memory controller to process the transaction based on the second address,
   wherein decoding comprises generating the second address such that the second address comprises a partially decoded address.

2. A method comprising:
   decoding a first address of a transaction to a memory to generate a second address; and
   issuing the transaction to provide a memory controller with the second address, and to request the memory controller to process the transaction based on the second address,
   wherein decoding comprises generating the second address such that the second address comprises an intermediate form that the memory controller decodes quicker than a non-decoded address.

3. A method comprising:
   decoding a first address of a transaction to a memory to generate a second address; and
   issuing the transaction to provide a memory controller with the second address, and to request the memory controller to process the transaction based on the second address,
   wherein decoding comprises generating the second address such that the second address comprises two or more memory selects, and a format indicator that indicates a format of the second address.

4. A method comprising:
   decoding a first address of a transaction to a memory to generate a second address;
   issuing the transaction to provide a memory controller with the second address, and to request the memory controller to process the transaction based on the second address; and
   providing the memory controller with a format indicator that indicates a format of the second address.

5. The method of claim 4 wherein issuing comprises transferring the second address to the memory controller during one or more bus phases.

6. A method comprising:
   receiving an address of a memory transaction from an external component; and
   addressing a memory using the received address in response to determining that the address comprises a decoded address.

7. The method of claim 6 further comprising in response to determining that the address does not comprise a decoded address:
   decoding the address of the memory transaction to generate a decoded address; and
   addressing the memory with the generated decoded address.

8. The method of claim 6 further comprising forgoing decoding of the received address in response to determining that the address comprises a decoded address.

9. The method of claim 6 further comprising:
   determining that the address comprises a decoded address based upon an indicator supplied by the address.

10. The method of claim 6 further comprising:
    determining that the address comprises a decoded address based upon an indicator provided by the external component.

11. The method of claim 6 further comprising in response to determining that the address comprises a partially decoded address:

decoding the partially decoded address to generate a decoded address; and addressing the memory using the decoded address.

12. A method comprising:

receiving an address comprising a plurality of memory selects from a external component;

addressing a memory using the plurality of memory selects; and forgoing decoding of the address in response to determining that the address is completely decoded.

13. A method comprising:

receiving an address comprising a plurality of memory selects from a external component;

addressing a memory using the plurality of memory selects; and in response to determining that the address is partially decoded:

decoding the address to generate one or more additional memory selects; and addressing the memory using also the one or more additional memory selects.

14. A processor comprising:

an address decoder to generate one or more memory selects based upon an address of a memory transaction; and a bus interface to issue the memory transaction and to provide an address comprising the one or more memory selects, wherein the bus interface is to further provide a format indicator that indicates that the address comprises the one or more memory selects.

15. The processor of claim 14 wherein the address further comprises the format indicator.

16. The processor of claim 14 wherein the bus interface is to further generate a side-band signal to provide the format indicator.

17. A memory controller comprising:

a request interface to receive a first address of a memory transaction;

a memory interface to address a memory; and control logic to cause the memory interface to address the memory using the first address in response to determining that the first address comprises a decoded address.

18. The memory controller of claim 17 further comprising an address decoder, wherein the control logic, in response to determining that the first address comprises a partially decoded address, is:

to cause the address decoder to generate a decoded address from the first address; and to cause the memory interface to address the memory using the decoded address.

19. The memory controller of claim 17 further comprising an address decoder, wherein the control logic, in response to determining that the first address comprises a partially decoded address, is:

to cause the address decoder to generate one or more additional memory selects from a non-decoded portion of the first address; and to cause the memory interface to address the memory using one or more memory selects of the first address and the one or more additional memory selects generated from the non-decoded portion.

20. The memory controller of claim 17 further comprising an address decoder, wherein the control logic, in response to determining that the first address comprises a partially decoded address, is:

to cause the address decoder to generate a plurality of memory selects from an intermediate form of the first address; and to cause the memory interface to address the memory using the plurality of memory selects.

21. The memory controller of claim 17 further comprising an address decoder, wherein the control logic, in response to determining that the first address comprises a non-decoded address, is:

to cause the address decoder to generate a decoded address from the first address; and to cause the memory interface to address the memory using the decoded address.

22. A system comprising:

volatile memory comprising storage locations arranged in a hierarchal manner;

a processor to generate from a first address of a memory transaction a second address comprising a plurality of memory selects and to issue the memory transaction on a processor bus to request processing of the memory transaction and to provide the second address; and a memory controller coupled to the processor via the processor bus and to the volatile memory via a memory bus, the memory controller to receive the memory transaction and the second address via the processor bus and to apply the plurality of memory selects of the second address to the memory bus.

23. The system of claim 22 wherein:

the processor is to further provide the memory controller with a format indicator that indicates the second address is decoded; and the memory controller is to forgo decoding of the second address in response to the format indicator indicating that the second address is decoded.

24. The system of claim 22 wherein:

the processor is to further provide the memory controller with a format indicator that indicates the second address is partially decoded; and in response to determining the format indicator indicates that the second address is partially decoded, the memory controller is to generate one or more additional memory selects and is to address the volatile memory using the plurality of memory selects and the one or more additional memory selects.

25. A machine-readable medium comprising a plurality of instructions that in response to being executed result in a processor:

decoding a first address of a transaction to a memory to generate a second address;

issuing the transaction to provide a memory controller with the second address, and to request the memory controller to process the transaction based on the second address;

generating a format indicator that indicates the second address is decoded; and providing the memory controller with the format indicator.

26. The machine-readable medium of claim 25 wherein the plurality of instructions in response to being executed further result in the processor generating the second address such that the second address comprises a plurality of memory selects.

27. A machine-readable medium comprising a plurality of instructions that in response to being executed result in a processor:

decoding a first address of a transaction to a memory to generate a second address;

issuing the transaction to provide a memory controller with the second address, and to request the memory controller to process the transaction based on the second address;

generating a format indicator that indicates that the second address is partially decoded; and providing the memory controller with the format indicator.

28. The machine-readable medium of claim 27 wherein the plurality of instructions in response to being executed further result in the processor generating the second address such that the second address comprises an intermediate form.

29. A processor comprising:

circuitry to execute instructions, an address decoder to generate one or more memory selects based upon an address of a memory transaction; and a bus interface to issue the memory transaction and to provide an address comprising the one or more memory selects.

30. The processor of claim 29 wherein the bus interface is to further provide a format indicator that indicates that the address comprises the one or more memory selects.

31. The processor of claim 30 wherein the address further comprises the format indicator.

32. The processor of claim 30 wherein the bus interface is to further generate a side-band signal to provide the format indicator.

33. The processor of claim 29 further comprising a register to define an address format, wherein the address decoder generates the one or more memory selects based upon the address format of the register.

34. A processor comprising circuitry to execute instructions, an address decoder to decode a first address of a memory transaction to a second address for the memory transaction, and a bus interface to issue the memory transaction and to provide the second address for the memory transaction.

35. The processor of claim 34 wherein the address decoder generates the second address such that the second address comprises a decoded address.

36. The processor of claim 34 wherein the address decoder generates the second address such that the second address comprises a partially decoded address.

37. The processor of claim 34 wherein the address decoder generates the second address such that the second address comprises an at least partially decoded address and a format indicator that indicates a format of the second address.

38. The processor of claim 34 further comprising a register to define an address format, wherein the address decoder decodes the first address to the second address based upon the address format defined by the register.

39. The processor of claim 34 further comprising a register to define an address format, wherein the address decoder generates the second address such that the second address comprises a non-decoded first address in response to the address format indicating non-decoded format.

* * * * *